A. R. BULLOCK.
SYNCHRONOUS MOTOR.
APPLICATION FILED OCT. 19, 1912.

1,232,209.

Patented July 3, 1917.
2 SHEETS—SHEET 1.

Witnesses:
E. B. Gilchrist
A. D. Hudson

Inventor
Arthur R. Bullock
by Thurston Ellis
Atty

A. R. BULLOCK.
SYNCHRONOUS MOTOR.
APPLICATION FILED OCT. 19, 1912.

1,232,209.

Patented July 3, 1917.
2 SHEETS—SHEET 2.

Witnesses
E. B. Gilchrist
A. J. Hudson

Inventor
Arthur R. Bullock
by Thurston & Kwis
Atty

UNITED STATES PATENT OFFICE.

ARTHUR R. BULLOCK, OF CLEVELAND, OHIO, ASSIGNOR TO HENRY C. LEE, TRUSTEE, OF LOS ANGELES, CALIFORNIA.

SYNCHRONOUS MOTOR.

1,232,209.     Specification of Letters Patent.     Patented July 3, 1917.

Application filed October 19, 1912. Serial No. 726,608.

*To all whom it may concern:*

Be it known that I, ARTHUR R. BULLOCK, a citizen of the United States, residing at Cleveland, in the county of Cuyahoga and State of Ohio, have invented a certain new and useful Improvement in Synchronous Motors, of which the following is a full, clear, and exact description.

This invention relates to synchronous motors, the object being to so construct such a motor as to eliminate the hunting action which is an undesirable feature of this class of motors, and also to provide a synchronous motor which is self starting.

Figure 1:
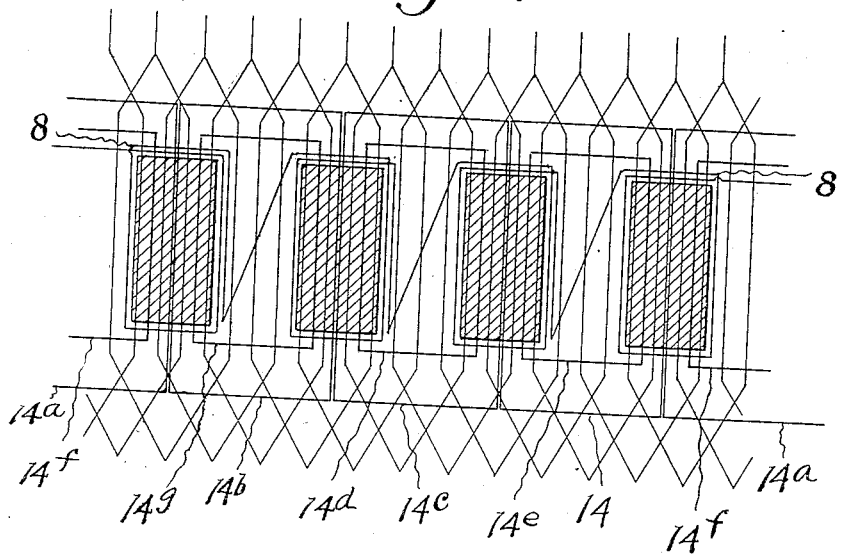
Figure 2:
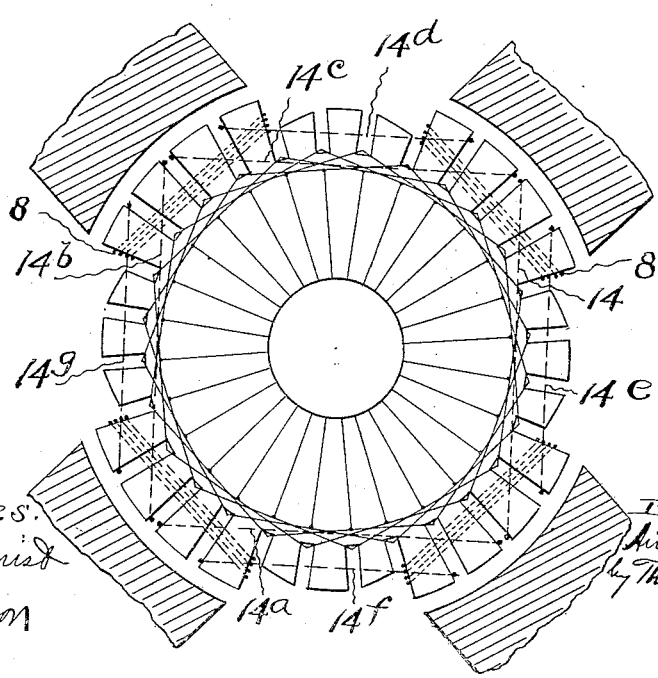
Figure 3:
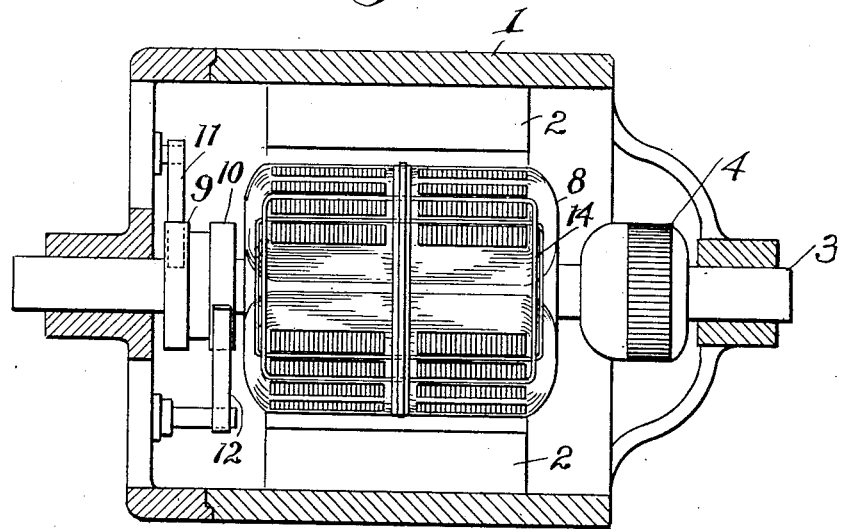
Figure 4:
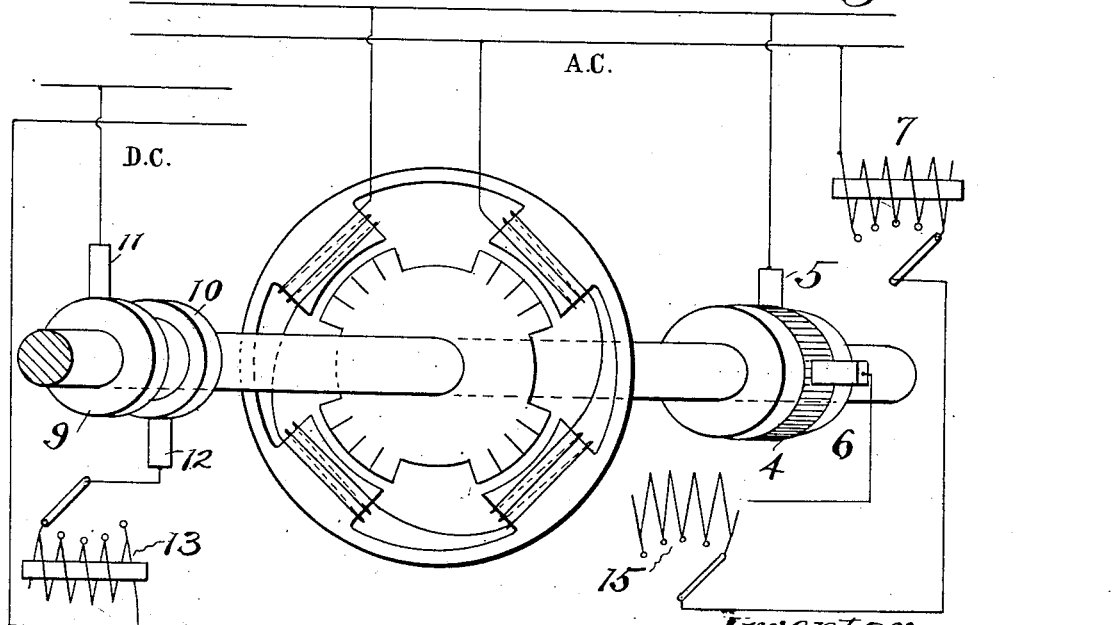

Reference should be had to the accompanying drawings forming a part of this specification in which Figure 1 is a diagrammatic illustration of the windings upon the rotor; Fig. 2 is a diagrammatic illustration in section of the windings upon the rotor; Fig. 3 is a top plan view of the motor with portions of the stator removed; Fig. 4 is a diagrammatic illustration of the electrical connections to the sources of operating current.

In the usual type of synchronous motors, suitable windings upon the stator pole projections are excited by an alternating current, thereby producing a changing flux, and other windings upon the pole projections of the rotor are excited by a direct current which produces a constant field or flux of fixed polarity.

Obviously the arrangement just described may be reversed, that is to say, the alternating current windings may be carried by the rotor and direct current windings may be carried by the stator; in either case, the effect is the same.

The reaction between the A. C. flux and the D. C. field flux produces a rotation of the rotor in synchronism with the A. C. generator supplying alternating current to the motor.

I have given the theoretical conditions under which synchronous motors run. It is, however, in practice impossible to secure the ideal conditions under which the motor should theoretically run. For instance, the alternating current of a commercial circuit, especially a power circuit is usually lagging in character, and furthermore, its characteristics are constantly changing, due to the constantly changing conditions upon the line. Consequently, a synchronous motor operating upon such a line develops the A. C. flux, of which the position of the poles which should theoretically be produced are almost never coincident with the position of the actual poles, that is to say, the alternating current flux lags, and the varying line conditions will produce a shifting of the theoretical position of the poles produced by the A. C. flux which results in producing an unstable condition in the A. C. field.

Now it should be remembered that the poles formed by the direct current are fixed and stable. Therefore the shifting of the poles produced by the alternating current results in a leading or lagging of the rotor with respect to the position which it should theoretically take, as the reversals occur in the alternating current flux. This condition of affairs when once developed, rapidly becomes worse, until the rotor falls out of step and stops.

There is another phenomena which I have discovered to be present in such synchronous motors with which I am familiar which should also be considered, and that is the fact that the direct current windings of the motor will be moved relatively at least to the alternating current flux, and will by so much have induced within them a pulsating current, in accordance with the well known law that a conductor passing through a field of flux so as to cut the lines of force will have a current induced therein. This pulsating current will flow over the same conductors as the direct current. This then produces a surging current and is an added complication.

Further the D. C. windings having the current induced in them and being moved are doing work, and as is well known, the current induced will develop a field which opposes the inducing field and will retard movement of the rotor. The result is a disturbed condition of the fields produced by both the direct and alternating currents and a hunting action is set up.

Taking into consideration what has just been said with regard to the instability of the A. C. flux and the generation of an induced current in the D. C. windings, it will be apparent that these two factors are very potent in producing the hunting action.

Having therefore ascertained the conditions producing hunting in a synchronous motor, it is the purpose of this invention to remedy these adverse conditions.

I am aware that efforts along this line have heretofore been made. Sometime ago De Ferrenti proposed a short circuited series of conducting tubes placed in pole pieces of either the rotor or stator, according as the rotor or stator was used to maintain the direct current field, but this did not prove satisfactory or effective particularly in the smaller sizes of synchronous motors, and it is my opinion that as we find the A. C. flux inducing a current in the usual D. C. windings of the motor, there is probably a current induced in the short circuited tubes which would have the same disturbing action with regard to the synchronous running of the motor as was previously discussed with regard to the A. C. current induced in the D. C. windings.

The next step, and the one now at least partially used was a circular cage comprising annular conducting rings which were spaced apart by a series of tubes arranged parallel to each other, the tubes being electrically connected at their opposite ends to the cage. Therefore, all the tubes in the cage are short circuited. The cage is usually held by embedding certain of the tubes in the pole pieces of the rotor or stator, as the case may be.

This cage, however, has not resulted in the stopping of the hunting particularly in small motors, and it would appear that the same inherent defect as in the De Ferrenti construction is present,—perhaps not so pronounced, but nevertheless sufficiently pronounced to permit hunting of the motor.

In the present invention, I have eliminated the pulsating current induced in the direct current winding by placing a choke coil in series with the circuit supplying the direct current. The resistance of this choke is low, so that the direct current is but little if any effected, while on the other hand, the alternating current is choked or repressed, thereby leaving the direct current to flow undisturbed through the direct current windings.

For the purpose of compensating for the variation of the alternating current, I propose to use what I may term an electrical governor, which shall be carried by that part of the machine which is not provided with alternating current windings for the synchronous motor flux.

The governor comprises a conductor forming a part of a closed circuit or a closed or short circuited coil of conducting material placed upon either the rotor or stator according as the windings to produce the A. C. flux for the motor are carried by the stator or rotor. The position of the coil is such that when the rotor poles and stator poles are in alinement, a perpendicular to the plane of the coil and passing through the center of the rotor will lie 90 electrical degrees from the center of the rotor and stator poles. Or differently expressed, the axis of the coil is substantially ninety electrical degrees removed from the adjacent alternating current poles, when the alternating current flux at the pole which the coil is approaching is a minimum.

In shape the coil may be substantially rectangular, for two of the opposed sides will usually extend parallel with adjacent pole pieces and along the center of the same.

Suppose as a definite example, that the A. C. windings are carried by the stator, and the D. C. windings are carried by the rotor. I will then provide a closed coil of conducting material, the plane of the coil symmetrically intersecting the adjacent pole pieces,—that is to say, the plane of the coil is arranged to lie at 90 electrical degrees away from the center of the poles produced by the direct current.

Now, as this coil rotates through the flux produced between the stator poles, there will be a pulsating current induced in the coil. This means that work is being done as the coil is moved, and in accordance with the well known law that any conductor carrying a current and doing work tends to assume a position in which it will be doing a minimum amount of work, or in other words, cutting the least number of lines of force, this coil will then assume a position which will be 90 electrical degrees from the adjacent north and south A. C. poles, and therefore the influence exerted by these poles just mentioned will be equal and balanced, and the coil will tend to remain in equilibrium.

It will be remembered that the coil just described is placed upon the rotor in a position 90 electrical degrees removed from the poles produced by the current flowing through the windings upon the rotor, and is also placed to be 90 electrical degrees from the poles produced by the current flowing through the windings upon the stator, when the stator and rotor poles are in registry. Therefore, the final position assumed by this coil will be such as to correctly position the rotor poles with respect to the stator poles, and thereby correct any tendency for the rotor to speed up or lead, or to run slow, or lag, from the correct speed necessary to maintain the rotor in synchronous running with respect to the reversals of the alternating current flux.

If it be found desirable or necessary additional coils such as those represented at 14$^d$, 14$^e$, 14$^f$, 14$^g$ may be also used.

In addition to the foregoing, I have provided a synchronous motor which is self starting, and for this purpose, upon the rotor I employ two sets of windings, one set being the well known drum winding, while the other set is a series of coils engaging the pole pieces upon the rotor, and are intended to receive a direct current for the purpose of establishing a definitely polarized field,— it being understood that the stator is provided with a winding adapted to receive alternating current.

In Figs. 3 and 4, 1 may represent the casing of the motor, and 2 represents pole pieces of the stator. The rotor is carried upon a shaft 3, as is the usual construction, and the rotor is laminated, as is the usual construction, the disks composing the rotor, assuming a form as is shown in Fig. 2.

In the lower portions of the slots of the rotor, a drum winding is provided, coils of which are connected with the commutator 4 shown in Fig. 3. Upon this commutator are two brushes 5 and 6, it being possible to use two brushes, due to the fact that the coils of the drum winding are interconnected to permit of this. The brushes 5 and 6 are respectively connected to the two sides of an alternating current circuit.

In series with the circuit which supplies the brushes 5 and 6, I introduce a reactance indicated at 7. This reactance is adjustable so that the impedance to the alternating current may be adjusted.

Formed coils 8 are wound upon the projecting pole pieces of the rotor, these coils being connected in series and electrically connected to rings 9 and 10, which are carried upon, but electrically insulated from the shaft 3. Bearing upon these rings are brushes 11 and 12 which are electrically connected with a source of direct current.

In series with the circuit to the brushes 11 and 12, I place a choke coil or reactance as indicated at 13. A conductor forming a closed short circuit coil 14 is placed upon the rotor so as to lie within the center slots of each polar projection. The coil is flat and as shown in the drawings, there may be four such coils or a lesser or greater number as may be desired. These coils may be entirely distinct and separate from each other, or there may be proper electrical connections between them so that all coils used may form in effect a single coil.

Preferably the stator windings and the drum windings upon the rotor are connected in parallel with the alternating current circuit.

In starting the motor in accordance with the construction just described, the alternating current is supplied to the windings upon the pole pieces of the stator, and in addition alternating current is supplied to the drum winding upon the rotor, simultaneously introducing a certain amount of the reactance 7 in the drum winding circuit. This reactance creates a lagging current which will create a flux which changes at the same time as the flux produced by the stator pole windings, for, as is well known, the current passing through the stator windings is lagging. Consequently, the reaction between the A. C. flux of the rotor and the stator will produce a rotation of the rotor which will bring the rotor to a speed which may equal or exceed the frequency of the alternating current. When a speed slightly above the synchronous speed has been obtained, the direct current circuit through the polar windings upon the rotor is closed and subsequently the circuit through the drum winding is opened. Preferably the circuit through the drum windings is gradually opened through a resistance 15, for I have found that it is easier and more certain, if the D. C. windings are energized before the drum winding current is cut off, and further, the gradual cutting off of the current flowing through the drum winding is of great assistance in assuring certainty of synchronism without repeated trials. The flow of the direct current produces a fixed polarization of the field poles, which reacting with the flux produced by the A. C., causes the continued rotation of the rotor in accordance with the principle of the synchronous motor.

As before stated, the choke 13 in the D. C. circuit, eradicates the pulsating current which would otherwise flow through the coils 8 upon the rotor, thereby insuring the flow of direct current only through these coils, and further, as before explained, the closed coil 14, or closed coils 14, as the case may be, will act to regulate and govern the rotation of the rotor so as to prevent the rotor from leading or lagging with respect to the reversals of the A. C. flux.

I have found in the operation of a synchronous motor of the type herein described, that it is not necessary to excite the coils 8 upon the rotor with direct current. That is to say, this circuit may be left open, in which event, it will rotate through the field without doing any work, for the circuit is not closed, but forms in effect an open circuited rotating coil.

To illustrate,—the motor may be brought up to speed in the manner previously explained. If, when the proper speed for synchronism has been obtained, the alternating current through the drum winding be opened, I have found that the rotor will continue to rotate, and that in synchronism with the alternating current, probably by virtue of the fact that a current is induced in the coil or coils 14. This current is evidently of proper strength and direction to create a field of definite polarity, at least at such times as this definite polarity may be required, that is to say, upon the reversal of the A. C. flux.

The reason why it is desirable to use a D. C. field in operating the motor, lies in the fact that a field of definite polarization is thereby obtained, and further a greater torque for the rotor is secured.

Having thus described my invention, what I claim is:

1. In a system of electrical distribution, in combination, a synchronous motor having a rotor member and a stator member, windings upon said members, one of which is a commutated winding, means for connecting said windings in parallel to an alternating current source, a D. C. polar winding carried by one of said members, means for connecting the latter to a direct current source while the first-named windings are connected to the alternating current source, and means for gradually cutting out said commuted winding after the D. C. polar winding has been connected.

2. In a system of electrical distribution, in combination, a synchronous motor having a stator member, and a rotor member, a winding producing fixed poles carried by the stator, means for connecting the latter to an alternating current source, and a closed coil carried by the rotor, said coil having parallel sides which extend along the rotor, the sides of the coil being spaced apart substantially a distance equal to that produced between the centers of adjacent poles.

3. In a system of electrical distribution, in combination, a synchronous motor having a stator member and a rotor member, a winding producing fixed poles carried by the stator member, a commuted winding carried by the rotor member, said windings being adapted for connection in parallel to an alternating current circuit, a D C polar winding carried by the rotor, adapted to be connected to a direct current circuit whereby the rotor runs in synchronism with the reversals of current supplied to the winding producing a fixed pole, and means for gradually inserting a resistance in the circuit with the commuted winding and then disconnecting said winding from the circuit.

4. In a system of electrical distribution, in combination, a synchronous motor having a rotor member and a stator member, a winding producing fixed poles upon one of said members, a starting winding upon the other of said members, an alternating current circuit to which the said windings are connected in parallel, means for cutting out the starting winding when the motor has attained the required speed, a D C polar winding carried by that one of the aforesaid members which is opposite to the member carrying the winding producing fixed poles, a direct current to which the D C winding is connected, and one or more closed coils carried by that one of the aforesaid members which is opposed to the member carrying the winding for producing fixed poles, the plane of said coils being at right angles to a radius or radii of the rotor member.

5. In a system of electrical distribution, in combination, a synchronous motor having a rotor member and a stator member, a winding producing fixed poles upon one of said members, a starting winding upon the other of said members, an alternating current circuit to which said windings are connected, a D C polar winding carried by that one of said members which is opposite the member carrying the winding producing fixed poles, a direct current circuit to which the D C winding is connected, one or more closed coils carried by that member which is opposed to the member carrying the winding producing fixed poles, said coil or coils having their axes at substantially 90 electrical degrees from the path of flux between adjacent poles when the flux is minimum.

6. In a system of electrical distribution, in combination, a synchronous motor having a stator member and a rotor member, a winding producing fixed poles carried by one of said members, an alternating current circuit to which said winding is connected, and a closed coil carried by the other of said members, said coil having parallel sides which extend transversely with respect to the rotor and stator, the sides of the coil being spaced apart substantially a distance equal to that between the centers of adjacent poles.

7. In a system of electrical distribution, in combination, a synchronous motor having a stator member and a rotor member, a winding producing fixed poles carried by one of said members, an alternating current circuit to which said winding is connected, and a plurality of closed coils carried by the other of said members, each of said coils having parallel sides which extend transversely with respect to the rotor and stator, the sides of each coil being spaced apart a distance substantially equal to that between the centers of adjacent poles.

8. In a system of electric distribution, in combination, a synchronous motor having a rotor member and a stator member, a winding producing fixed poles upon one of said members, an alternating current circuit to which said winding is connected, a D. C. polar winding carried by the other of said members, a direct current circuit to which the winding is connected, a pair of conductors, each conductor substantially bisecting a pole produced by the D. C. flux, said conductors being connected to form a coil, the said conductors being carried by that member upon which the polar winding is carried.

9. In a system of electrical distribution, in combination, a synchronous motor having a rotor member and a stator member, a winding producing fixed poles on one of said members, an alternating current circuit to which said winding is connected, a D. C. polar winding carried by the other of said members, a direct current circuit to which said winding is connected, a closed coil carried by the member having the D. C. polar winding, said coil having parallel sides which extend transversely with respect to the rotor and stator, the sides of the coils substantially bisecting adjacent poles produced by the D. C. flux.

10. In a system of electrical distribution, in combination, a synchronous motor having a rotor member and a stator member, a winding producing fixed poles on one of said members, an alternating current circuit to which said winding is connected, a D. C. polar winding carried by the other of said members, a direct current circuit to which said winding is connected, a plurality of closed coils carried by the member which has the D. C. polar winding, each of said coils having parallel sides which extend transversely with respect to the rotor and stator, the sides of each coil substantially bisecting adjacent poles produced by the D. C. flux.

11. In a system of electrical distribution, in combination, a synchronous motor having a rotor member and a stator member, a winding producing fixed poles carried by one of said members, an alternating current circuit with which said winding is connected, a D C winding carried by the other of said members, a direct current circuit with which said winding is connected, and a closed coil having side portions which extend substantially parallel with the axis of the rotor, and extending centrally of the polar portions of the member upon which they are carried, said coil being mounted upon that member which is opposed to the member carrying the winding producing fixed poles.

12. In a system of electrical distribution, in combination, a synchronous motor having a rotor member and a stator member, a winding producing fixed poles carried by one of said members, an alternating current circuit with which said winding is connected, a D. C. polar winding carried by the other of said members, a direct current circuit with which the last mentioned winding is connected, means in circuit with the last mentioned winding for suppressing the flow of current which may be induced in said winding by the A C flux, a closed coil carried by the member having the D. C. polar winding, said coil having parallel sides which extend transversely with respect to the rotor and stator, the sides of the coil substantially bisecting adjacent poles produced by said D. C. polar winding.

13. In a system of electrical distribution, in combination, a synchronous motor having a rotor member and a stator member, a winding producing fixed poles carried upon one of said members, a starting winding carried by the other of said members, an alternating current circuit with which said windings are connected in parallel, a resistance in circuit with the starting winding, whereby the current to said winding may be gradually cut out, a D C polar winding carried by that member which is opposite the member carrying the winding producing fixed poles, and a direct current circuit with which said winding is connected.

14. In a system of electrical distribution, in combination, a synchronous motor having a rotor member and a stator member, a winding producing fixed poles carried by one of said members, a starting winding carried by the other of said members, an alternating current circuit with which said windings are connected in parallel, a reactance in circuit with the starting winding, a resistance in circuit with the starting winding, whereby the current to said winding may be gradually cut out, a D C polar winding carried by the member which is opposite to the member having the winding for producing fixed poles, and a direct current circuit with which the last mentioned winding is connected.

15. The method of starting a self starting synchronous motor in which alternating current fields are produced by windings upon rotor and stator, and in which direct current windings produce a fixed field, which consists in first closing the circuits to the A. C. windings and when the speed of the rotor exceeds the synchronous speed, then closing the circuit through the D. C. windings, and subsequently gradually cutting out the current to one of the A. C. windings which does not react with the D. C. field.

16. The method of starting a self starting synchronous motor in which there are A. C. pole windings upon the stator and a drum winding upon the rotor, and a D. C. pole winding upon the rotor, which consists in first closing the circuits through the stator windings and drum windings, and when the speed of the rotor exceeds the synchronous speed, then closing the circuit to the D. C. pole windings, and subsequently gradually cutting out the current to drum winding.

17. The method of starting and synchronizing a synchronous motor having a polar winding on one element and a commuted winding and a polar winding on the other element, which consists in inserting impedance in the circuit of the commuted winding and impressing an alternating electromotive force in said circuit and upon said first polar winding to accelerate the motor above synchronism, then impressing a continuous electromotive force upon said other polar winding, and finally interrupting the supply of alternating current to the commuted winding.

In testimony whereof, I hereunto affix my signature in the presence of two witnesses.

ARTHUR R. BULLOCK.

Witnesses:
A. J. HUDSON,
E. M. FREEMAN.